(12) United States Patent
Mese et al.

(10) Patent No.: US 9,286,696 B2
(45) Date of Patent: Mar. 15, 2016

(54) COMPRESSION WITHIN A SET OF IMAGES

(71) Applicant: Broadcom Corporation, Irvine, CA (US)

(72) Inventors: Murat Mese, Rancho Palos Verdes, CA (US); Wade Keith Wan, Orange, CA (US)

(73) Assignee: Broadcom Corporation, Irvine, CA (US)

( * ) Notice: Subject to any disclaimer, the term of this patent is extended or adjusted under 35 U.S.C. 154(b) by 91 days.

(21) Appl. No.: 13/928,227

(22) Filed: Jun. 26, 2013

(65) Prior Publication Data

US 2014/0301652 A1 Oct. 9, 2014

Related U.S. Application Data

(60) Provisional application No. 61/809,510, filed on Apr. 8, 2013.

(51) Int. Cl.
| | |
|---|---|
| *G06K 9/36* | (2006.01) |
| *G06T 9/00* | (2006.01) |
| *G06F 17/30* | (2006.01) |
| *G06K 9/46* | (2006.01) |
| *H04N 19/503* | (2014.01) |

(52) U.S. Cl.
CPC ............ *G06T 9/00* (2013.01); *G06F 17/30247* (2013.01); *G06K 9/46* (2013.01); *H04N 19/503* (2014.11)

(58) Field of Classification Search
USPC .......... 382/218, 235, 243, 251, 278; 358/538, 358/539

See application file for complete search history.

(56) References Cited

U.S. PATENT DOCUMENTS

| | | | | |
|---|---|---|---|---|
| 6,516,030 B1 * | 2/2003 | Lynch et al. | ............. | 375/240.11 |
| 6,556,716 B2 * | 4/2003 | Hong | ............. | 382/232 |
| 6,631,161 B1 * | 10/2003 | Kajiki et al. | ............. | 375/240.01 |
| 6,631,164 B1 * | 10/2003 | Sorin et al. | ............. | 375/240.26 |
| 6,697,061 B1 * | 2/2004 | Wee et al. | ............. | 345/419 |
| 6,792,156 B2 * | 9/2004 | Lee | ............. | 382/249 |
| 6,853,710 B2 * | 2/2005 | Harris | ............. | H04M 1/57 379/142.01 |
| 7,302,015 B2 * | 11/2007 | Kim | ............. | H04N 19/557 348/E5.066 |
| 7,305,075 B2 * | 12/2007 | Harris | ............. | H04M 1/57 379/142.01 |
| 7,773,816 B2 * | 8/2010 | Wen | ............. | H04N 19/176 382/233 |

* cited by examiner

*Primary Examiner* — Yosef Kassa
(74) *Attorney, Agent, or Firm* — Brinks Gilson & Lione (57) ABSTRACT

The present disclosure relates generally to a system and method for file compression. More specifically, the disclosure introduces to a method for file compression wherein a group of files is identified by comparing a plurality of similarity characteristics. The group of files may then be compressed relative to at least one base file to improve compression efficiency.

14 Claims, 9 Drawing Sheets

COMPRESSION WITHIN A SET OF IMAGES

CROSS REFERENCE TO RELATED APPLICATIONS

This application claims the benefit of U.S. Provisional Patent Application No. 61/809,510 filed Apr. 8, 2013, the content of which is hereby incorporated by reference in its entirety.

TECHNICAL FIELD

This disclosure relates generally to a system and method for compression and more specifically a system and method for image or file compression.

BACKGROUND

Innovations in modern technological devices have introduced improvements in quality, resolution, and improved functionality of devices. While technological advancements have improved the capability of many electronic devices, it has also increased the storage and transmission requirements for data files. Some examples of this trend include increased resolution in digital image files, music files, digital document files, and other form of digital media. In response to the growing demand for storage capacity for digital media, there exists a need for improvements in storage and compression of digital media to make efficient use of available storage. In response to this need, this disclosure provides for methods and systems for improved compressed of digital media files.

DETAILED DESCRIPTION

Figure 1:
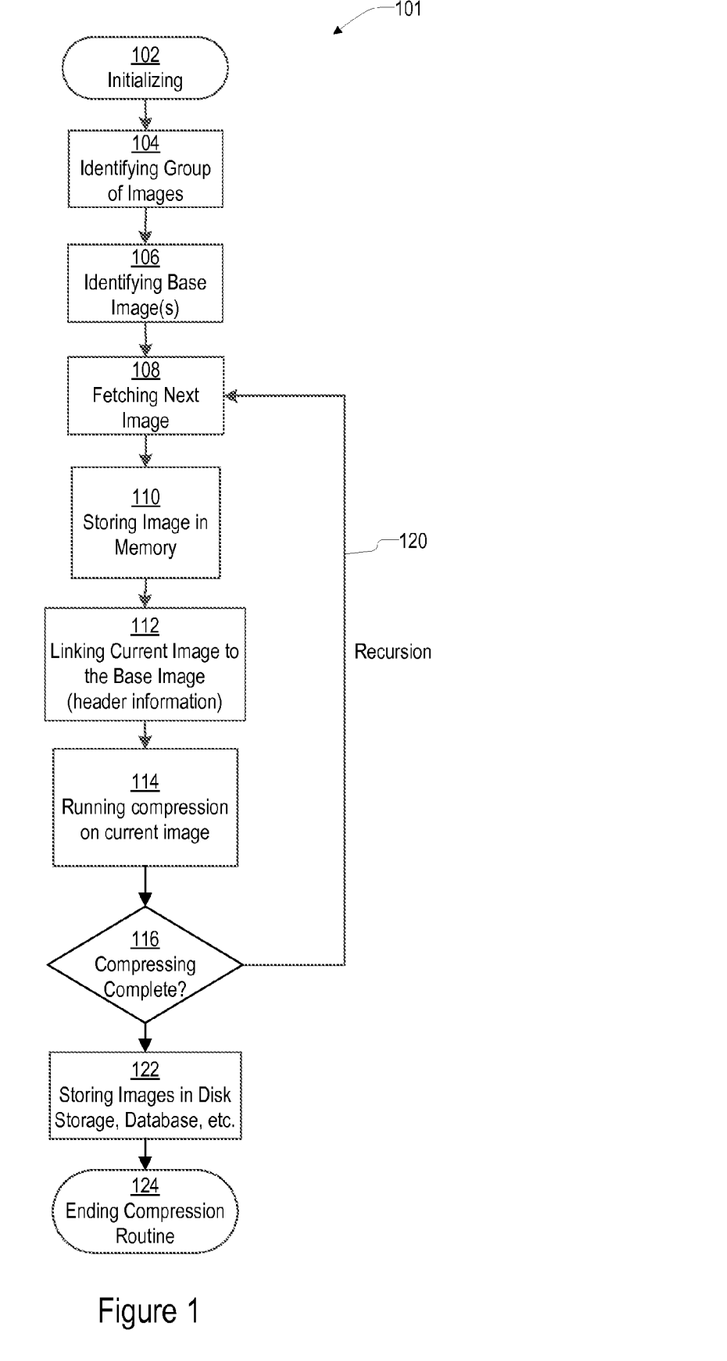
FIG. 1 shows an example of a flow chart of a method for compressing a set of images.

FIG. 1 shows an example of a flow chart of a method for compressing a set of images. The method 101 for compression may be initialized by receiving a control signal from a processor, controller, or another similar device initializing the compression of files, such as image files, for example digital photographs (102). The method 101 may first identify a group of images based on a set of similarity characteristics (104). Similarity characteristics may comprise at least one identifying characteristic that may suggest that the images are related. Some examples of similarity characteristics may include a file name or location, a plurality of image capture properties of a digital camera, location data relating the location from which a file originated, and other auxiliary metadata that may be stored with one or more files.

Once a group of images having at least one similarity characteristic has been identified, a base image may further be identified within the group of images (106). The identified base image may comprise one or more features identified by analyzing the group of images and determining at least one common feature among the group of images that is also found in the identified base image. The common feature may comprise any similarity among the group of images or files that is common to the base image or files. A similarity may comprise a similar pixel or pixel block common to a base image and at least one image of the group of images. A pixel block may, for example, comprise a plurality of similar pixels, edges, faces, or any other features that may be identified among a group of images. The methods disclosed herein are exemplary and should not be considered limiting to the disclosure.

Once the group of images and the base image have been identified, the compression method may fetch an image of the group of images, for example from a storage device such as a static memory or disk drive (108). The image may be stored in memory for access during compression (110). The image may then be linked to the base image (112). Linking the image in memory to the base image may comprise writing properties to a header file relating the image in memory to the base image. The image in memory may then be compressed by a variety of image processing methods and/or algorithms (114).

Image compression methods may comprise the application of a difference algorithm, motion estimation, and pixel compression and may further include at least one method wherein at least one similar feature is compressed in the image stored in memory that corresponds to the base image. The compressed image may be stored in a storage device along with corresponding header information relating the compressed image to the base image and the group of images, for example, once compression of the image stored in memory has been completed. In other implementations, a compression table relating each image of the group of images to a base image may be applied instead of or in addition to the header information.

Upon completion of compression of the first image, the method may continue to determine if compression is complete for the entire group of images (116). If each image of the group of images has not been compressed, the method may continue via a recursion technique 120 to retrieve a next image of the group of images and compress the next image by repeating steps 108-120 until each image of the group of images has been compressed.

Upon completion of the compression routine, the compressed group of identified images and the identified base image may be stored in a storage device (122). The images may be stored in a storage device, such as a disk memory, database, or other suitable storage unit, until one or more images of the group of images is requested for decompression. The method disclosed herein may provide for a group of compressed images having at least one similarity that may be common among the group of images and the identified base image. This similarility may be compressed in a plurality of images of the group of images and linked, for example, through header information to at least one identified base image in order to optimize image compression among each image of the group of images. Though various methods of image compression and image storage including linking the group of images to the identified base image through header information are disclosed herein, it is contemplated within this disclosure that other methods of compression, relating files, and storing file information may be applied in accordance with the disclosure.

Figure 2:
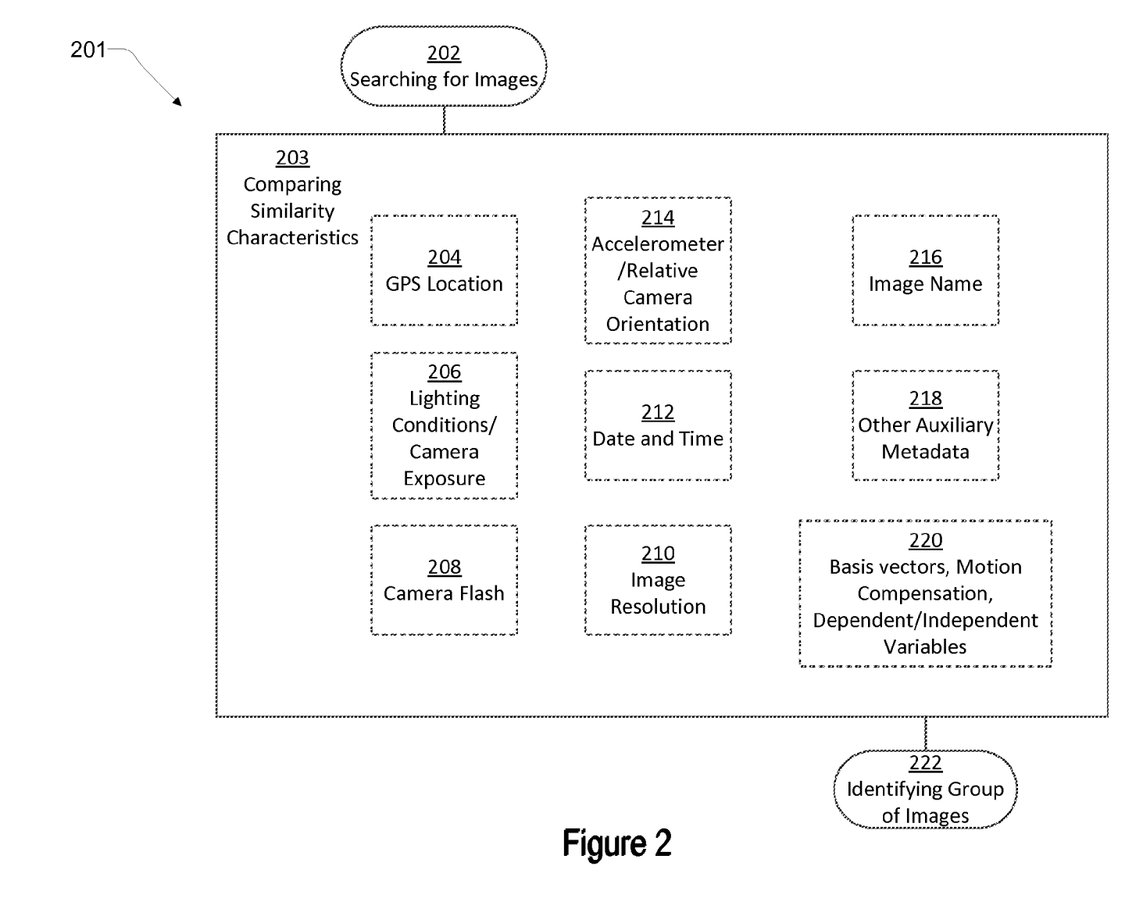
FIG. 2 shows an example of a diagram demonstrating various similarity characteristics that may be compared to identify a group of images.

FIG. 2 shows an example of a diagram demonstrating various similarity characteristics that may be compared to identify a group of images. An identification process 201 may comprise a plurality of steps in order to identify images having similar characteristics. The method 201 may begin by searching for images in a storage device (202). The method may then continue by comparing each image found to a least one of a plurality of similarity characteristics (203). By identifying images having similar characteristics compression of a group of images may be optimized. The identification process 201 may comprise searching or scanning through a plurality of images stored in a storage device, such as a fixed media, disk storage, or memory that may comprise one or more similarity characteristics.

In one implementation, a group of similarity characteristics may be related to a plurality of image capture properties of a camera. When capturing images with a camera, many identifying characteristics may be stored to determine whether similar features may have been captured in each image of a group of images. The process for identifying a group of images may begin by comparing a location of a plurality of stored images to determine if the images were captured in similar locations (204). The location may be a GPS location stored within the image, for example a GPS unit in a camera phone. Images captured at the same or similar locations may have a higher likelihood of comprising more similar features than images captured in differing locations. Similar features may later be identified and compressed during image compression to optimize compression of the group of images.

The similarity characteristics that may be applied to identify the group of images may comprise a plurality of image capture properties that may be saved to a header file within each image when the images are captured by a camera. These similarity characteristics may comprise lighting conditions, exposure, f-stop of a captured image (206). Another similarity characteristic that may be compared may comprise whether a camera flash activated during image capture (208). Another similarity characteristic that may be compared to identify a group of images may also comprise a resolution of an image (210). The date and time that each image was captured may also be compared (212). These properties may further be applied to identify a group of image that may have an increased likelihood of comprising a plurality of similar features that may be later compressed during image compression.

The orientation of an image capturing device as measured by an accelerometer may further be compared as a similarity characteristic (214). The orientation, motion, or position of an image capturing device also may be recorded by a gyro, rate sensor, inertial measurement unit, or smart mobile type sensors. The orientation of the camera may also be beneficial in some implementations to aid in searching for similar features by identifying a common direction to scan each image with respect to gravity. The name of an image may also be compared as a similarity characteristic (216). Another similarity characteristic may comprise a folder in which a group of images is stored or any other auxiliary metadata (218).

In some implementations, one or more advanced image processing techniques may also be applied to identify a group of images (220). Some advanced processing techniques may comprise face recognition, image processing filters, and edge detection for identifying similarities among a group of images. Other advanced processing techniques may also be applied to identify a group of images, including image processing to determine similar basis vectors among images, motion compensation among images, and recurring comparisons among the dependent and independent feature vectors. Identification of a group of images may be based on any of the similarity characteristics disclosed or any combination of similarity characteristics. Once the images have been compared for similarity characteristics, a group of images may be identified (222).

The methods and techniques applied to identify a group of images may vary depending on a plurality of system variables. Each of the methods for identifying a group of images disclosed may vary among applications. Some of the advanced processing techniques may not be suited to some devices with limited processing power or during certain periods of operation. For this reason, identification and compression of the group of images may be completed as a scheduled task, for example in response to a power state (e.g. when the battery exceeds a certain level or when the device is connected to external power), a system idle state, or a predetermined time setting. In some systems the relative performance of a system may limit the application of some of advanced processing techniques. In other systems, identifying and compressing the group of images may be dependent on the available system processing power.

A variety of methods may be applied for compression of the group of images. Lossy or lossless compression may be applied to compress the group of images, as well as, other forms of compression applied to compress still images. In some implementations, compression methods may comprise reduction of color space, chroma sampling, transform coding, entropy encoding, and/or predictive coding. Motion estimation techniques may be applied to compress similar features of the group of images relative to the base image. Compression data relating the group of images in their compressed form to the base image may be stored in header files linking each image of the group of images to the base image. Compression data may also comprise a compression table to relate each compressed image of the group of images to one another and to a base image. By first determining one or more similarity characteristics relating a group of images, images may be grouped to improve the likelihood that each image may contain one or more similar features. Identifying similarity characteristics prior to compression may improve compression efficiency in accordance with the disclosure.

In some implementations, a base image may be identified by a recurring comparison to determine an image of the group of images that best exemplifies the similar features among the group of images. In other implementations, multiple base images may be identified among the group of images. Secondary base images may also be identified to allow compression among the group of images and multiple base images through a hierarchical compression method. A dependency may also be configured such that an image may depend on multiple base images in parallel. Further methods of compression of the group of images are further discussed below.

Figure 3:
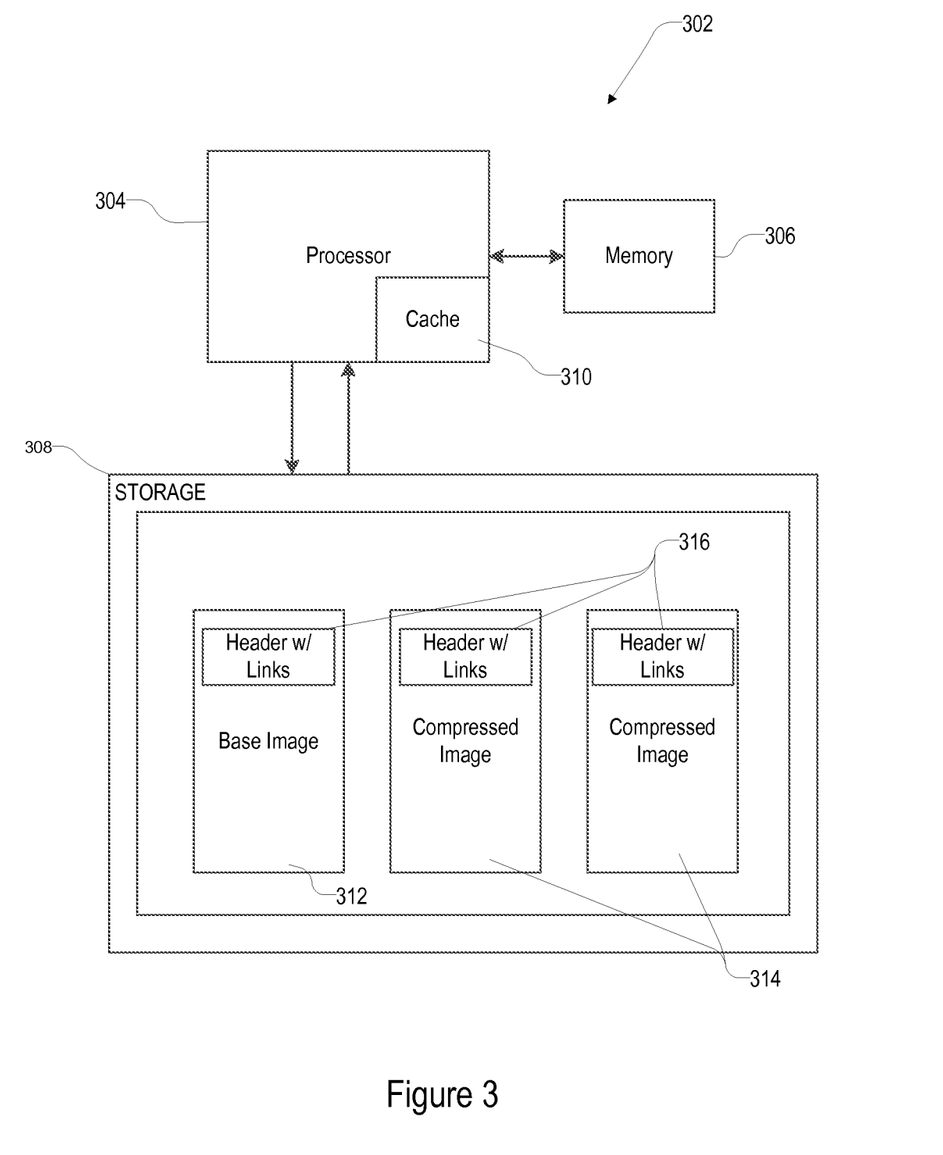
FIG. 3 shows an example of a block diagram of an implementation of a system for identifying and compressing a group of images.

FIG. 3 shows an example of a block diagram of a system 302 for identifying and compressing a group of images. The system 302 may generally comprise a processor 304, memory 306, and storage 308. The processor 304 may comprise any processor, microcontroller, or integrated circuit that may be configured for image processing. The processor 304 may further comprise a cache 310 and be operably coupled to the memory 306. The memory may comprise any memory capable of storing digital information, for example random access memory (RAM), dynamic RAM (DRAM), and may be on the same chip as the processor or may be off chip. During compression one or more images may be fetched by the processor 304 and stored into memory 306. Once the images are stored in memory 306, the processor may selectively access relevant image information relating to similarity characteristics of the images and store the information in the cache 310. From the similarity characteristics of the images, the processor may group images having at least one common similarity characteristic by comparing similarity characteristics, for example as described in FIG. 2. Once the group of images has been identified, the processor may then compress each image of the group of images by compressing similar features common to the image and the base image. Following the compression of a first image, the processor 304 may continue to assign header information and compress each image of the group of images. During compression, similar features may be compressed in each image corresponding to a base image.

Each image may be stored and organized within storage 308 comprising at least one base image 312 and at least one compressed image 314 of the group of images. In some implementations, a base image 312 and the compressed image 314 may each be identified and linked through header information 316. Header information may be applied to facilitate decompression of one or more images of the group of images.

In some implementations, a group of files may be identified for compression by comparing a plurality of similarity characteristics found the group of files. The group of files may include, but are not limited to digital image files, music files, digital document files, and various forms of digital media files. In some implementations, the disclosed systems and methods may be adapted to search a plurality of files for a group of files having at least one similarity characteristic. From the group of files, a base file may further be identified corresponding to at least one common portion among the group of files and the group of files may be compressed relative to the at least one common portion relative to the base file.

The similarity characteristics compared to identify the group of files may comprise names of files, types of files, one or more locations of files, the origin of the files, and any metadata that may be identified to relate the files of the group of files to one another. The common portion of the group of files may comprise any common characteristic found among the group of files and may comprise common code, features, and other common portions that may be provide for improved compression among a group of files. The group of files may be compressed through a recursive process wherein each file of the group of files is compared to at least one base file. Common portions of each file relative to the at least one base file may be compressed. Data relating the compressed files may be stored in a header file relating each file of the group of files to the at least one base file and/or in a compression table providing compression data that may be implemented to decompress the group of files.

Figure 4:
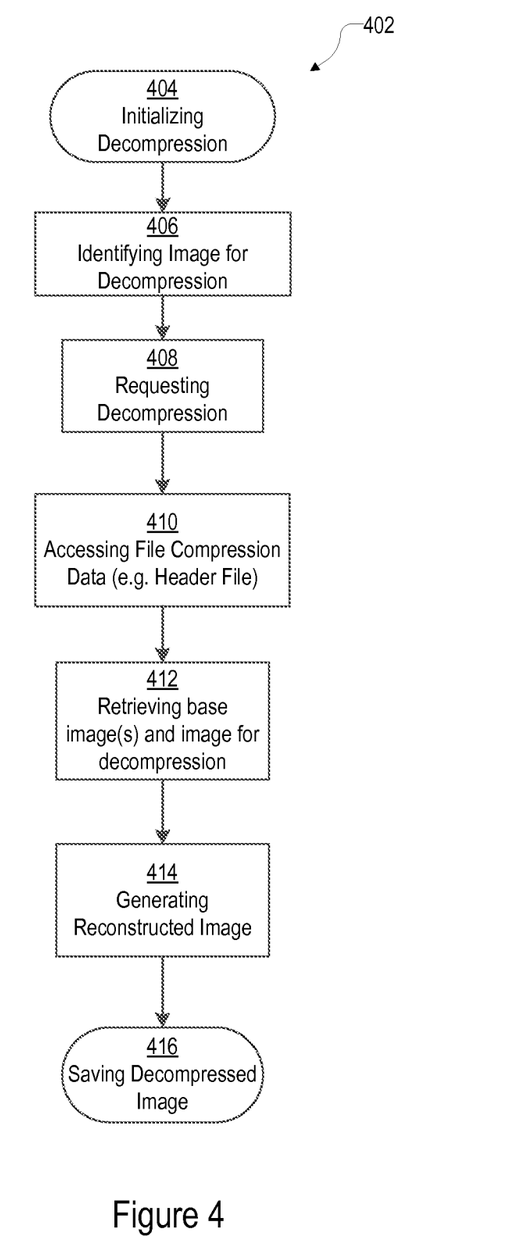
FIG. 4 shows an example of a flow chart of a method for image decompression.

FIG. 4 shows an example of a flow chart of a method 402 for image decompression. The method 402 may begin by initializing decompression of at least one image (404). In order to provide for access to each image among a group of compressed images the method for compression in a group of images may provide for a user to identify a compressed image (406). Once identified the method may request decompression of the compressed image (408). Such a request may initiate a processor to access compression data for the identified compressed image (410). The compression data may be accessed to determine the method of image compression applied to compress the group of compressed images. The header file or compression data may provide instructions to a processor to retrieve one or more base images that may correspond to the identified compressed image (412). The compression data may further provide instructions for decompression. With the instructions or identification of the compression method, the image requested for decompression may be reconstructed and decompressed (414). The decompression process may be completed by saving the decompressed image providing access to the image (416).

Figure 5:
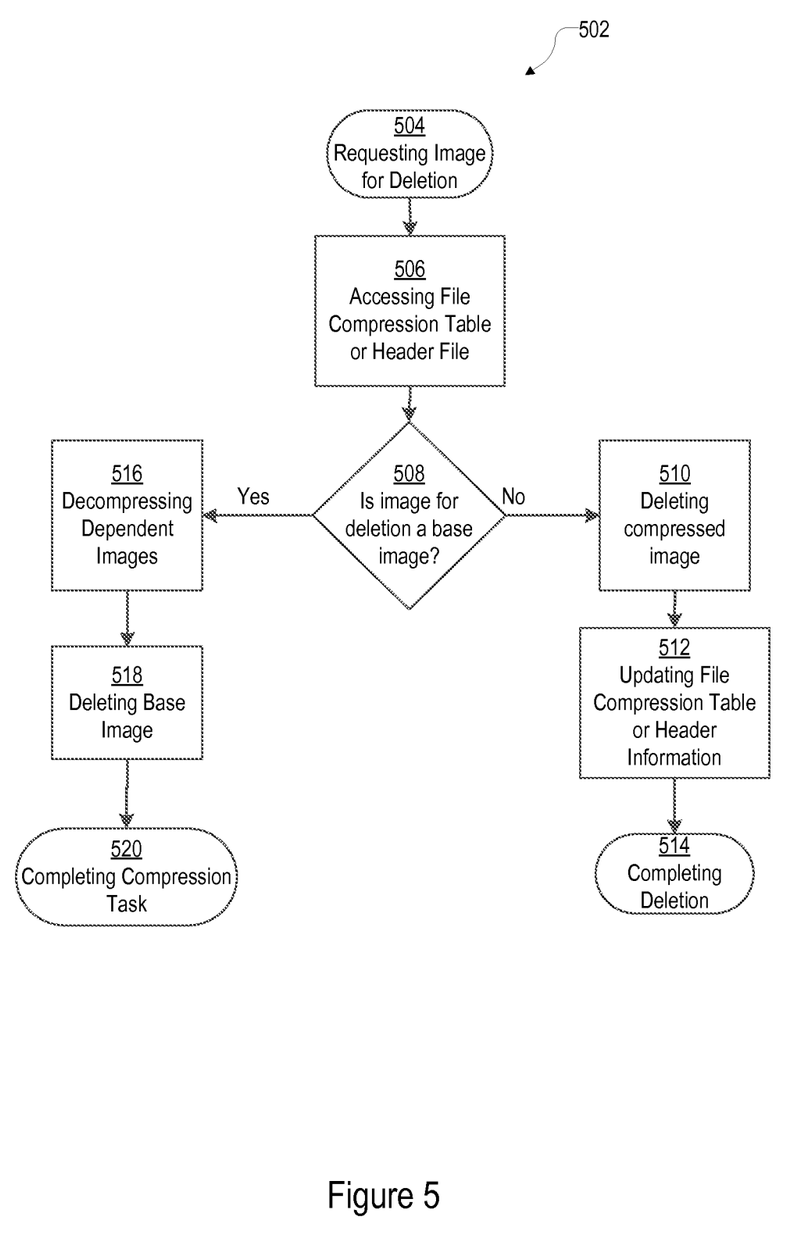
FIG. 5 shows an example of a flow chart of a method for deletion of a compressed image.

FIG. 5 shows an example of a flow chart of a method 502 for deletion of a compressed image. The method 502 may begin in response to a request for image deletion (504). A processor may then access the image compression table or header file to determine the image compression data for the image (506). From the compression data, the method 502 may determine if the image is a base image or an image that has been compressed relative to a base image (508). Determining if the image requested for deletion is a base image may provide for selective deletion of a compressed image among the compressed group of images.

If the image requested for deletion is not a base image, the compressed image may be deleted (510). Following deletion, any compression data (e.g. header information) relating to the image requested for deletion may be updated (512). Once the compression data is updated, the deletion process may be completed (514). If the image requested for deletion is not a base image, the deletion of the compressed image may not require decompression and recompression of the group of images to delete the requested image. Decompression and recompression may not be required because other images of the group of images may not be dependent on the compressed image requested for deletion.

If the image requested for deletion is a base image, the base image may have one or more images that require the base image for decompression. In this example, a group of compressed images may be decompressed by applying the method introduced in FIG. 4 or one similar thereto (516). Once the decompression process is completed the base image requested for deletion may be deleted (518). The resulting group of images may then be recompressed by applying one of the compression tasks (e.g. FIG. 1) disclosed herein (520).

Figure 6:
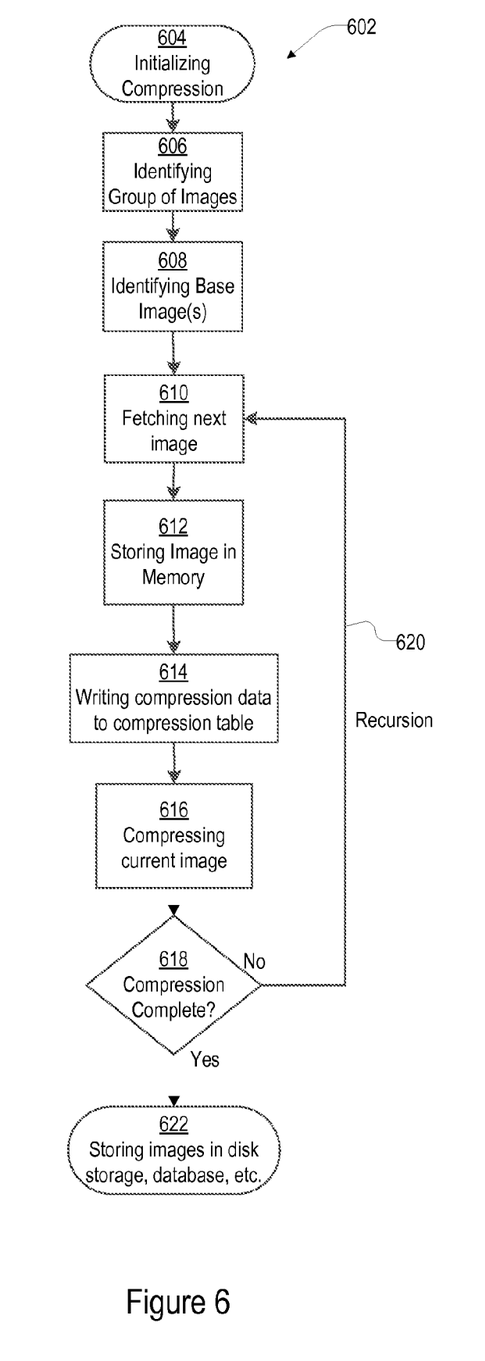
FIG. 6 shows an example of a flow chart of a method for compressing a set of images.

FIG. 6 shows an example of a flow chart of a method 602 for compressing a set of images. Similar to the method introduced in FIG. 1, the method 602 may be initialized by a processor, controller, or user instructions (604). The method may first identify a group of images (606). A base image may then be identified as having one or more features that may be similar among the group of images (608). The method may continue by fetching an image of the group of images for compression (610). The image may then be stored in memory for processing (612). Once the image is stored in memory, the compression information may be determined for the image and written and stored (614). The compression data may be stored in a compression table, matrix, header file or another file type. The compression data may relate the image stored in memory for compression to each image of the group of images and the base image.

With the compression information captured, the method may continue to run compression on the image in memory using motion estimation or other image processing techniques to compress similar or common features from the image of the group of images relative to the base image. Upon completion of compression of the image in memory, the method may continue to determine if each image of the group of images 606 has been compressed (618). A recursion process may then be applied until each image of the group of images has been compressed (620). Once each image of the group of images is compressed, the compression routine may save the compressed group of images including the base image and the compression data to a storage device (622). A similarity or common feature may comprise any similarity among the group of images or files that is common to the base image or files. A common feature may comprise, for example, a similar pixel or pixel block. A pixel block may, for example, comprise a plurality of similar pixels, edges, faces, or any other features that may be identified among a group of images.

Figure 7:
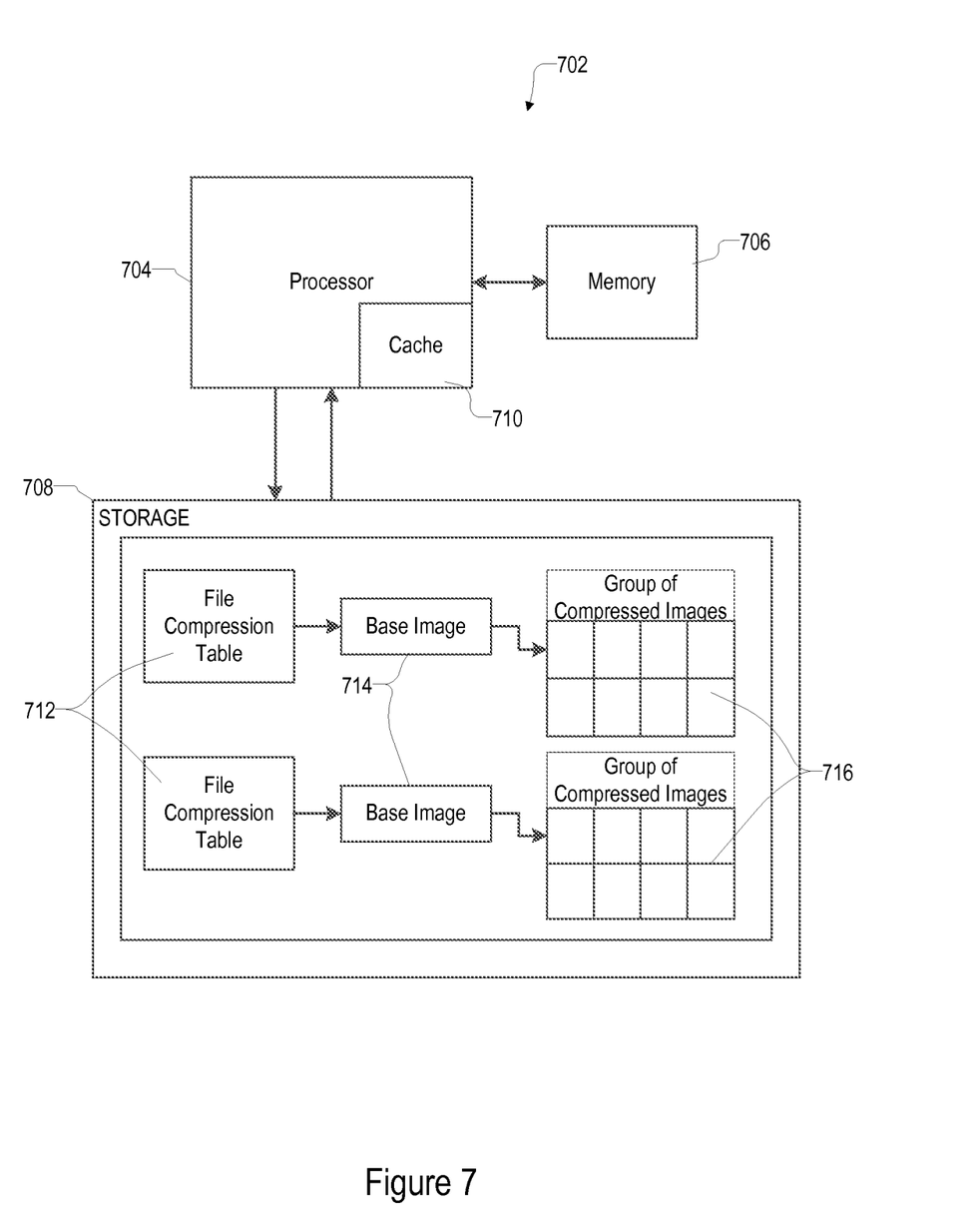
FIG. 7 shows an example of a block diagram of an implementation of a system for identifying and compressing a group of images.

FIG. 7 shows an example of a block diagram of an implementation of a system 702 for identifying and compressing a group of images. Similar to the system disclosed in FIG. 3, this implementation of the system 702 may generally comprise a processor 704, memory 706, and storage 708. The processor 704 may access information in storage 708 and copy it to memory 706. The memory 706 may comprise any memory capable of storing digital information, such as RAM. The information in storage may comprise images, groups of images, compression data or other data and files that may be compressed, accessed, and decompressed. The processor 704 may further store information for processing and comparing images in cache 710 and save a group of compressed images and corresponding compression data in storage 708.

In this implementation the compression data for a group of compressed images may comprise a file compression table 712. The file compression table may comprise information relating a base image 714 to a group of compressed images 716. The file compression table may associate any similar features that may have been compressed in the group of compressed images 716 during compression. The base image 714 and the group of compressed images 716 may further include header information that may identify characteristics of each of the images and relationships of each of the images to the base image. The compression data 712 may be applied when decompressing an image, reviewing an image, or deleting an image as previously described. In general, the compression data stored in the file compression table 712 may provide for the decompression and reconstruction of one or more of the compressed images 716 in relation to the base image 714.

Figure 8:
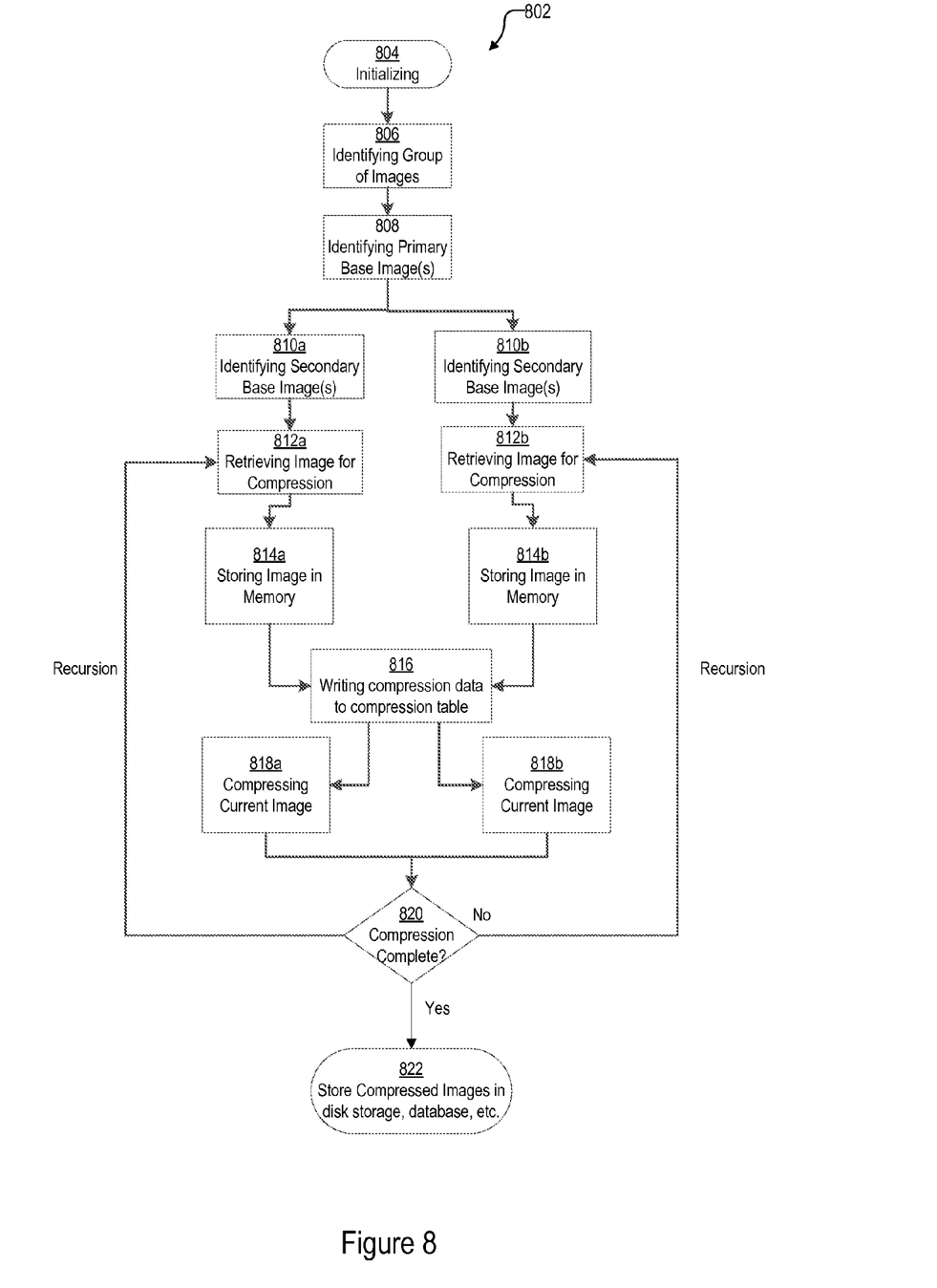
FIG. 8 shows an example of a flow chart for a method of image compression comprising a primary base image and a secondary base image.

FIG. 8 shows an example of a flow chart for a method 802 of image compression comprising a primary base image and a secondary base image. In this implementation, the method 802 may be initialized by a user instruction, processor, controller, or other suitable integrated control circuit (804). The method may then identify a group of images for compression (806). Within the group of images, the method may identify a primary base image having the most similar features among each image of the group of images (808). In this implementation, a plurality of secondary base images may further be identified for at least a first subset (810a) and a second subset (810b). The secondary base images may include one or more features of the primary base image and may also include one or more features that correspond to each subset of the group of images.

At step 810 of the method 802 may be completed similarly for a plurality of secondary base images. For clarity, the method will be disused for a single, secondary base image. The secondary base image may correspond to a first subset of the group of images and/or a second subset of the group of images. Once the primary base image and the secondary base images of the group of images have been identified, a compression task may be initialized. The compression task may first retrieve an image corresponding having a common feature to the first or second base image of each subset (812a, b). The image may then be stored in memory for compression of each subset (814a, b). During or after compression, the compression data for the image may be written to a compression table (816). The compression data in this implementation may relate the image in memory to the secondary base image and also may relate the each secondary base image to the primary base image in the compression table.

This implementation may further provide for increased compression among the group of images by compressing similar features from each image of a group of images that may correspond to a secondary base image and a primary base image. Further levels of hierarchical division and corresponding compression may include similar steps to the methods disclosed herein. The level of compression in a specific implementation may be applied in response to a requested level of compression, the processing capability of a specific system, and/or the available processing capacity of a system.

With the relevant compression information written to the compression table, the method may continue to compress the image in memory for each subset (818a, b). Compression may comprise applying one or more image compression techniques exemplified by compressing similar features among the group of images. Finally, similar to compression methods introduced in FIGS. 1 and 6, the process may continue to retrieve each image of the group of images through recursion until compression of the entire group of images is complete (820). Upon completion of compression, the group of compressed images and the compression table may be saved to a storage device, such as disk memory (822).

Figure 9:
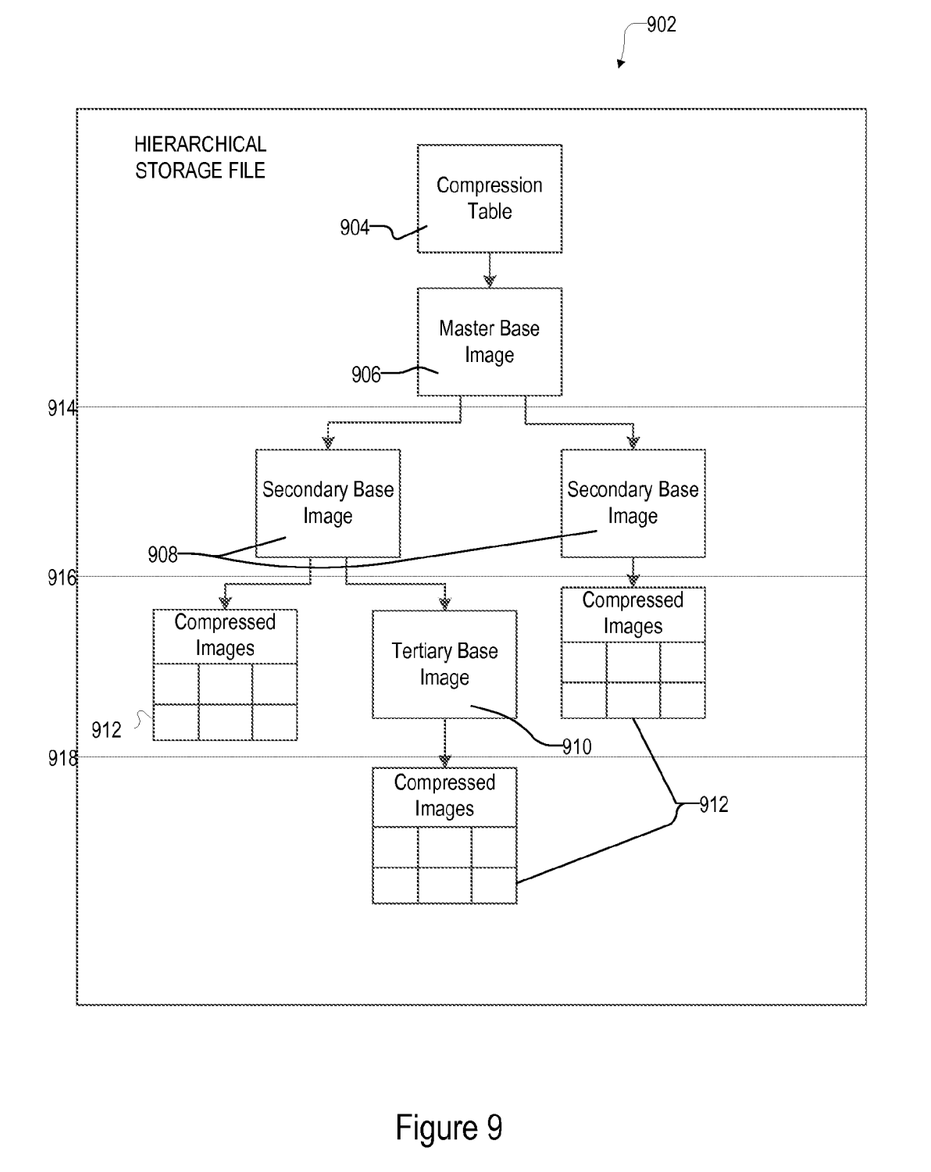
FIG. 9 is a block diagram of a memory unit figured for hierarchical storage of a set of compressed images.

FIG. 9 is a block diagram of a memory unit configured for hierarchical storage of a set of compressed images. A storage tile 902 may comprise a file compression table 904 and a primary base image 906 for compression. The storage tile may further be operable to store a plurality of secondary 908 and tertiary base images 910. At the bottom level of the hierarchy, compressed images 912 of the compressed group of images are stored. The compression table 904 may provide instructions and links providing for decompression and reconstruction of the compressed images 912. In this implementation, the file compression table may further provide for the removal of redundancies in each layer of dependency.

The layers of dependency are denoted by lines dividing primary/secondary 914, secondary/tertiary 916, and tertiary/quaternary 918 relationships. Beginning at the bottom of the hierarchy, common features that are similar among the compressed images below the tertiary base image 910 may be compressed. Hierarchical compression may for higher levels of compression among the group of images that have similar features to the tertiary base image 910 at level 918.

At the next level 916, the compressed images 912 and the tertiary base image 910 may have a plurality of features that may be compressed and related back the secondary base images 908 at level 914. Finally, in this example, the secondary base images may also have a plurality of similarity features compressed and related back to the primary base image 906 at the top level of the hierarchy 914. All of the representative information from each of the levels 914, 916 and 918 and the relation of similar features may be replaced through decompression and reconstruction of the images beginning with the primary image down to the secondary base images 908, tertiary base image 910 and the compressed images 912 from information stored in the file compression table 904.

The instant compression implementation describing the hierarchical storage tile may be applied at varying levels depending on the performance of a system performing compression, a level of compression requested, and the variety and quantity of images stored in a particular storage unit. In some implementations the storage tile 902, may be applied to large databases that may incorporate images stored from a variety of users such as file storage, media servers, social networking servers, and general network servers.

In some implementations a compression system may be activated in response to a plurality of system modes and/or preferences. One preference may be to activate compression at a scheduled time. This application may be especially beneficial for implementations storing large quantities of images or those having fluctuating processing capability. In other implementations, the compression methods disclosed may be activated in response to a battery or charging state. Compression tasks may also be limited or delayed in response to a battery operation state.

It is noted that the various modules and/or circuitries described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

As a person skilled in the art will readily appreciate, the above description is meant as an illustration of the principles of this disclosure. This description is not intended to limit the scope or application of this disclosure in that the disclosure is susceptible to modification, variation and change, without departing from spirit of this disclosure, as defined in the following claims.

What is claimed is:

1. A method for compression of a group of images comprising:
    identifying at least one base image among a group of images, the at least one base image corresponding to at least one common feature of the group of images, wherein the at least one base image comprises a plurality of base images being related by a plurality of common features;
    defining each image of the group of images as a compressed image relative to the at least one base image based on the at least one common feature of the image of the group of images;
    generating image compression data comprising a relationship of each image of the group of images to the at least one base image; and
    storing each compressed image of the group of images and the image compression data.

2. The method according to claim 1, wherein defining each image of the group of images as a compressed image comprises comparing each image of the group of images to the at least one base image through a recurring comparison to identify a plurality of recurring features.

3. The method according to claim 2, wherein defining each image of the group of images as a compressed image comprises removing at least one recurring feature of the plurality of recurring features from at least one image of the group of images.

4. The method according to claim 3, wherein the at least one recurring feature is removed via a motion compensation algorithm.

5. The method according to claim 3, further comprising storing a relationship of the at least one recurring feature to the at least one image of the group of images and the at least one base image in the image compression data.

6. The method according to claim 1, wherein compression data is stored in a header file relating each image of the group of images to the at least one base image.

7. The method according to claim 1, wherein the plurality of base images comprises a hierarchy of image data relating each of the base images to at least one primary base image.

8. The method according to claim 1, wherein each base image of the plurality of base images are stored in a separate file.

9. The method according to claim 1, wherein each compressed image is stored in a separate file.

10. A system for compression among a set of images comprising:
    a memory unit;
    a processor operably coupled to the memory unit, the processor comprising at least one module in response to a power state configured to:
        search a plurality of images and identify a group of images corresponding to at least one similarity characteristic;
        identify a base image of the group of images corresponding to at least one common feature of the group of images;
        compare each image of the group of images to the at least one base image; and
        define each image of the group of images as a compressed image relative to the at least one base image based on the at least one common feature, wherein at least one recurring feature between each image of the group of images and the at least on base image is compressed.

11. The system according to claim 10, wherein the at least one module is further configured to generate compression data, the compression data defining a relationship of the at least one recurring feature of each image of the group of images to the at least one base image.

12. The system according to claim 10, wherein the processor is configured to initiate the at least one module in response to activation of a scheduled compression task.

13. The system according to claim 10, wherein the processor is configured to initiate the at least one module in response to an available processing capacity.

14. The system according to claim 10, wherein the memory unit comprises a memory in a mobile device.

* * * * *